(12) United States Patent
Pepper et al.

(10) Patent No.: US 12,049,302 B2
(45) Date of Patent: Jul. 30, 2024

(54) REDUNDANT HYDRAULIC POWER PACK ARCHITECTURE FOR AIRCRAFT MAIN LANDING GEAR SYSTEM

(71) Applicant: Eaton Intelligent Power Limited, Dublin (IE)

(72) Inventors: Joshua Boone Pepper, Madison, MS (US); Brady Powell Dearing, Canton, MS (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 206 days.

(21) Appl. No.: 17/538,721

(22) Filed: Nov. 30, 2021

(65) Prior Publication Data

US 2022/0169367 A1   Jun. 2, 2022

Related U.S. Application Data

(60) Provisional application No. 63/119,253, filed on Nov. 30, 2020.

(51) Int. Cl.
*B64C 25/22*   (2006.01)
*F15B 1/26*   (2006.01)
(Continued)

(52) U.S. Cl.
CPC ........... *B64C 25/22* (2013.01); *F15B 1/26* (2013.01); *F15B 13/028* (2013.01); *F15B 19/00* (2013.01);
(Continued)

(58) Field of Classification Search
CPC ......... B64C 25/22; B64C 13/42; B64C 25/30; B64C 25/60; F15B 1/26; F15B 13/028; F15B 19/00; F15B 2211/20576; F15B 2211/426; F15B 2211/6309; F15B 2211/7142; F15B 20/004;
(Continued)

(56) References Cited

U.S. PATENT DOCUMENTS 6,513,885 B1 * 2/2003 Salamat ................ B60T 8/1703
                                                      303/DIG. 9
9,422,052 B2 * 8/2016 Kondo ................ B64C 13/504
(Continued)

FOREIGN PATENT DOCUMENTS

GB    757705 A    9/1956
GB    973364 A    10/1964
(Continued)

OTHER PUBLICATIONS

Extended European Search Report for European Patent Application No. 21210862.5 dated Apr. 26, 2022, 9 pages.

*Primary Examiner* — Medhat Badawi
*Assistant Examiner* — Vicente Rodriguez
(74) *Attorney, Agent, or Firm* — Merchant & Gould P.C.

(57) ABSTRACT

The left and right main landing gears on an aircraft are normally controlled by separate hydraulic power packs (HPP). Each HPP is sized for the load of the respective main landing gear. During failure of one of the HPP, a backup valve actuates to allow the other HPP to operate both main landing gears. With the backup valve actuated, the pump of the functioning HPP is coupled to the reservoirs of both HPPs and to the load paths to both main landing gears.

20 Claims, 5 Drawing Sheets

(51) Int. Cl.
    *F15B 13/02*     (2006.01)
    *F15B 19/00*     (2006.01)

(52) U.S. Cl.
    CPC ............... *F15B 2211/20576* (2013.01); *F15B 2211/426* (2013.01)

(58) Field of Classification Search
    CPC .... F15B 2211/30595; F15B 2211/8633; F15B 2211/8757; F15B 11/17
    See application file for complete search history.

(56) References Cited

U.S. PATENT DOCUMENTS

| | | | | |
|---|---|---|---|---|
| 2005/0082427 | A1* | 4/2005 | Seung | B64C 25/50 244/102 R |
| 2012/0097792 | A1* | 4/2012 | Ernis | B64C 25/22 244/100 R |

FOREIGN PATENT DOCUMENTS

| | | |
|---|---|---|
| GR | 1004181 B | 3/2003 |
| JP | 6283195 B2 | 7/2014 |
| WO | 2017/204698 A1 | 11/2017 |

* cited by examiner

REDUNDANT HYDRAULIC POWER PACK ARCHITECTURE FOR AIRCRAFT MAIN LANDING GEAR SYSTEM

CROSS-REFERENCE TO RELATED APPLICATION

This application claims the benefit of U.S. Provisional Patent Application No. 63/119,253, filed on Nov. 30, 2020, the disclosure of which is incorporated herein by reference in its entirety.

BACKGROUND

Many aircraft actuation systems are powered by a hydraulic system including high pressure and low pressure lines connecting a reservoir (i.e., a tank), a pump, filters, sensors, and at least one load (consisting of valves, actuators, etc.). For example, deployment and retraction of the main landing gear system of an aircraft may be powered by the hydraulic system. The main landing gear system includes a left main landing gear and a right main landing gear. Accordingly, a traditional hydraulic system includes a reservoir, pump, and other components sized to power both the left and right main landing gears. To provide redundancy, a second hydraulic system of the same size and configuration is provided to take over in case of failure of the first hydraulic system. Improvements are desired.

SUMMARY

Certain aspects of the disclosure are directed to a hydraulic system designed to power the main landing gear system of an aircraft with less weight while still providing redundancy (e.g., meeting the redundancy and failure requirements of FAA 14 C.F.R. § 25). Certain aspects of the disclosure are directed to a hydraulic system designed to power the main landing gear system of an aircraft within a smaller space while still providing redundancy.

In accordance with certain aspects of the disclosure, the hydraulic system includes a first hydraulic power pack sized to service one of the main landing gears (e.g., the left main landing gear), a second hydraulic power pack sized to service another of the main landing gears (e.g., the right main landing gear), and a backup valve arrangement configured to connect together the high pressure lines and the low pressure lines of the first and second hydraulic power packs to allow one of the first and second hydraulic power packs to service both the left and right main landing gears.

In accordance with certain aspects of the disclosure, the hydraulic system includes a hydraulic power pack including a pump, a high pressure line extending from the pump, and a return line disposed within a body. The return line extends towards a tank. The body defines a first pressure port receiving the high pressure line from the pump, a first return port fluidly coupled to the return line, and a second return port also fluidly coupled to the return line.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
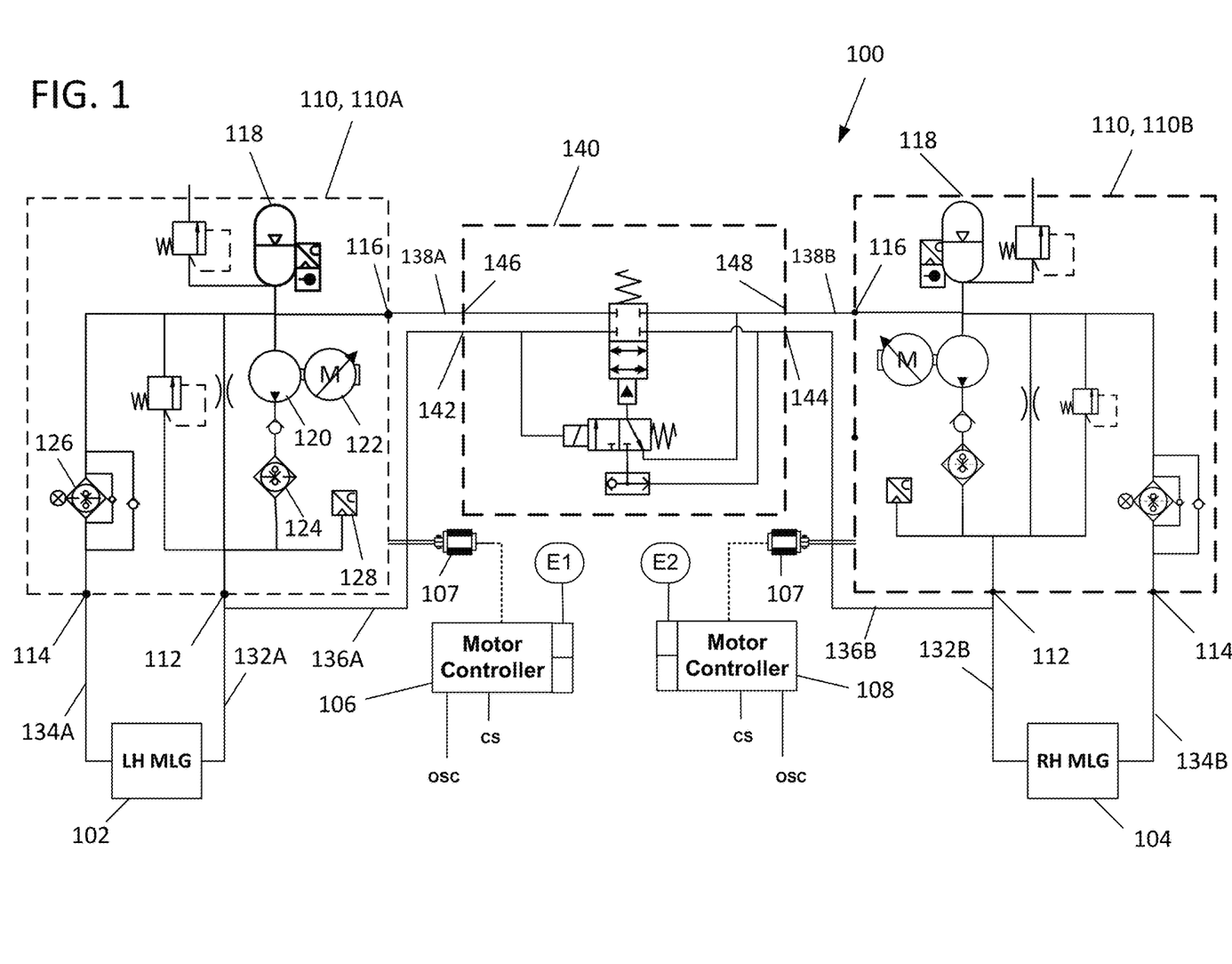
FIG. 1 is a schematic diagram of an example distributed hydraulic system for operating the main landing gear system of an aircraft, the distributed hydraulic system including two hydraulic power packs selectively fluidly coupled by a backup valve arrangement.

The present disclosure is directed to a distributed hydraulic power system 100 for use on an aircraft. For example, the distributed hydraulic power system 100 can be used to deploy the main landing gear of the aircraft, which includes a left main landing gear and a right main landing gear. The distributed hydraulic power system 100 provides redundancy in case of failure in the hydraulic power system, but without the weight of a traditional system.

Each of the left and right main landing gears is controlled by a respective actuation system 102, 104. Each actuation system 102, 104 includes one or more control valves and actuators to lower and raise the main wheels, actuate locks, open doors providing selective access to the wheels, or otherwise contribute the deploying and/or retracting the main landing gear. In certain implementations, the actuation systems 102, 104 each include a switch valve arrangement that controls how the high pressure fluid is applied to the actuator(s) in the actuation systems 102, 104 to switch between deployment and retraction.

The distributed hydraulic power system 100 includes a first power pack 110A, a second power pack 110B, and a backup valve arrangement 140. The first power pack 110A is configured to provide high pressure fluid (i.e., power) to an actuation system 102 of the left main landing gear via a high pressure line 132A and to receive low pressure fluid back from the left main landing gear actuation system 102 via a low pressure line 134A. The second power pack 110B is configured to provide high pressure fluid to an actuation system 104 of the right main landing gear via a high pressure line 132B and to receive low pressure fluid back from the right main landing gear actuation system 104 via a low pressure line 134B.

In certain implementations, the first power pack 110A is identical to the second power pack 110B. Each power pack 110A, 110B is sized (e.g., a respective reservoir and pump of the power pack is sized) to provide sufficient power to operate one of the main landing gear actuation systems 102, 104 within a first deployment time frame (e.g., 8 seconds, 12 seconds, 16 seconds, etc.) and a first retraction time frame (e.g., 8 seconds, 12 seconds, sixteen seconds, etc.). In certain examples, each power pack 110A, 110B is sized to operate only one of the actuation systems 102, 104 within the first deployment and retraction time frames. In such examples, each power pack 110A, 110B is sized to provide sufficient power to both of the main landing gear actuation systems 102, 104 within a second deployment time frame and a second retraction time frame. The second deployment time frame is longer than the first deployment time frame, but still short enough to safely deploy the main landing gear during landing of the aircraft. The second retraction time frame is longer than the first retraction time frame, but still short enough to safely retract the main landing gear during take-off of the aircraft.

In certain implementations, the second time frame is at least 1.2 times as long as the first time frame. In certain implementations, the second time frame is at least 1.5 times as long as the first time frame. In certain implementations, the second time frame is at least 1.8 times as long as the first time frame. In certain implementations, the second time frame is twice as long as the first time frame. In certain implementations, the second time frame is three times as long as the first time frame. In certain implementations, the second time frame is between 1.2 times and three times as long as the first time frame. In certain implementations, the second time frame is between 1.5 times and twice as long as the first time frame. In certain implementations, the second time frame is between 1.2 times and twice as long as the first time frame.

In other implementations, each power pack 110A, 110B can be configured to operate both main landing gear actuation systems 102, 104 at full performance rate (i.e., can operate both systems 102, 104 within the first deployment time frame and the first retraction time frame).

In normal use (i.e., when no power pack failures have occurred), the first power pack 110A provides power to the left main landing gear actuation system 102 while the second power pack 110B concurrently provides power to the right main landing gear actuator 104. A backup valve arrangement 140 remains closed during normal use, thereby maintaining separation of the first and second power packs 110A, 110B. In the event of a failure of one of the first and second power packs 110A, 110B, the backup valve arrangement 140 is opened to connect the still functioning power pack to both of the left and right main landing gear actuation systems 102, 104, concurrently.

Figure 2:
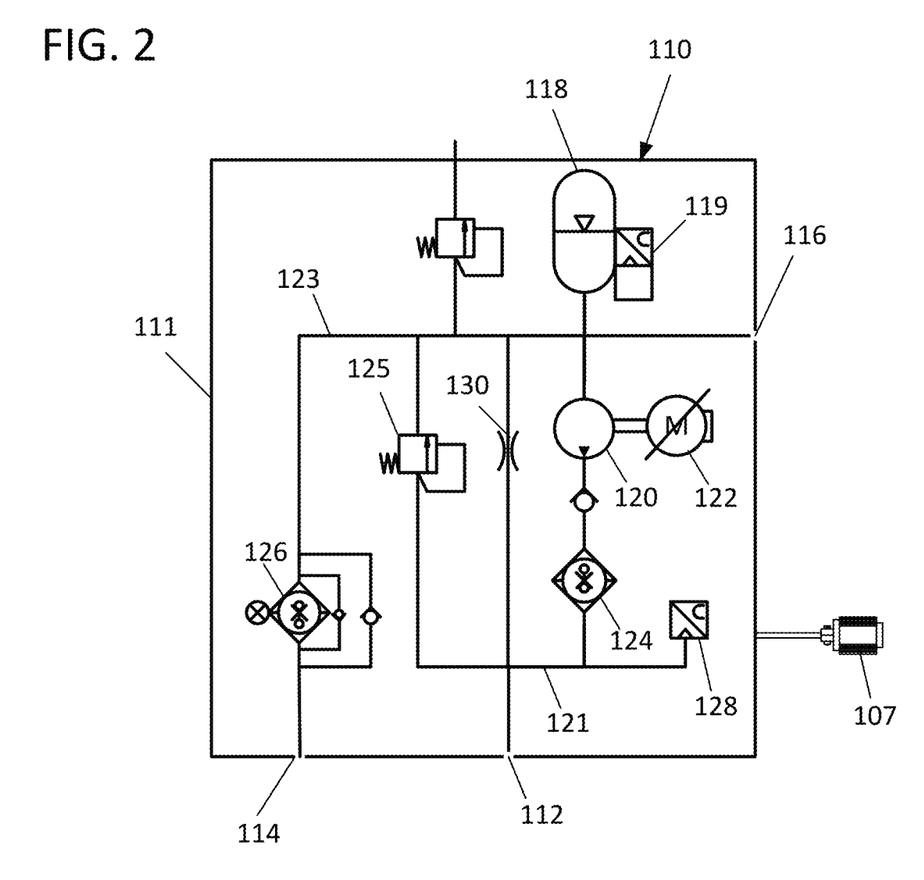
FIG. 2 shows a diagram of an example hydraulic power pack suitable for use in the distributed hydraulic system of FIG. 1.

FIG. 2 shows an example implementation of a hydraulic power pack 110 suitable for use as both the first power pack 110A and the second power pack 110B of FIG. 1. The hydraulic power pack 110 includes a body 111 having a load interface 112 and a first tank return interface 114 through which the power pack 110 can be fluidly coupled to the respective main landing gear actuation system 102, 104.

In some implementations, the power pack 110 includes a reservoir 118 disposed within the power pack body 111. In certain examples, the reservoir 118 is sized to hold a sufficient amount of fluid to power the respective main landing gear actuator 102, 104. In other implementations, the internal lines within the power pack body 111 can be fluidly coupled to an external reservoir via a tank interface defined through the power pack body 111. A low pressure line 123 fluidly couples the first return interface 114 to the internal reservoir 118 or tank interface. In certain implementations, the power pack body 111 also defines a second tank return interface 116 that is fluidly coupled to the internal reservoir 118 or tank interface. In certain examples, the second return interface 116 is fluidly coupled to the low pressure line 123. In certain examples, no filter modules are disposed between the second return interface 116 and the reservoir 118 or tank interface.

In some implementations, each interface 112, 114, 116 allows an external fluid conduit (e.g., a tube, pipe, hose, etc.) to connect to an internal fluid line within the power pack 110. For example, each interface 112, 114, 116 may provide attachment structure (e.g., threads, clamping surfaces, etc.) at which the fluid conduits can be attached to the power pack body 111. In other implementations, each interface 112, 114, 116 can provide a sealed port through which a fluid conduit can extend through a wall of the power pack body 111 to define at least a portion of both the respective internal fluid line and the respective external fluid line.

The power pack 110 includes a pump 120 configured to draw fluid from the reservoir 118 (or external reservoir), to pressurize the fluid, and to direct the high pressure fluid over a high pressure line 121 to the first load interface 112. The pump 120 is driven by a motor 122, which is controlled by an aircraft operating system via a respective motor controller 106, 108. In some implementations, the pump 120 includes a fixed displacement pump 120 driven by a variable speed motor pump 122. Other implementations are possible. Low pressure fluid is returned to the power pack 110 from the respective main landing gear actuator 102, 104 via the first return interface 114. The low pressure fluid travels over a low pressure line 123 from the first return interface 114 to the reservoir 118.

In certain implementations, a high pressure filter module 124 is fluidly disposed between an output of the pump 120 and the load interface 112. Accordingly, all of the high pressure fluid is filtered before reaching the respective main landing gear 102, 104. In certain implementations, a low pressure filter module 126 is fluidly disposed between the first return interface 114 and the reservoir 118. Accordingly, the low pressure fluid may be filtered again upon returning from the respective main landing gear actuator 102, 104. In certain examples, the low pressure filter module 126 includes a bypass around the low pressure filter module 126.

In certain implementations, the power pack 110 also includes a bypass or warming restrictor 130 that connects the high pressure line 121 to the reservoir 118 within the power pack body 111. However, the bypass restrictor 130 has a restricted passage that limits the amount of fluid that can travel therebetween. Accordingly, a small amount of high pressure fluid can return to the reservoir 118. In certain implementations, the power pack 110 includes a high pressure relief valve 125 between the high pressure line 121 and the reservoir 118. The valve 125 relieves the pressure in the high pressure line 121 if the pressure climbs above a predetermined maximum operating pressure.

In certain implementations, various sensors are disposed within the power pack 110 to monitor the pressure, temperature, and/or other characteristics of the fluid flowing through the power pack 110. For example, a pressure transducer 128 may be fluidly coupled to the high pressure line 121 to sense a pressure of the fluid within the high pressure line 121. The pressure transducer 128 is disposed downstream from the output of the pump 120. In certain examples, the pressure transducer 128 is disposed downstream from the high pressure filter module 124. Accordingly, the pressure transducer 128 may sense when pressure is lost either at the pump 120 or at the high pressure filter module 124.

In certain implementations, the various sensors also include a pressure transducer 119 at the reservoir 118. In certain examples, the pressure transducer 119 is a pressure and temperature transducer that measures both the pressure and the temperature of the low pressure fluid within the reservoir 118.

Referring back to FIG. 1, each power pack 110A, 110B is fluidly coupled to the backup valve arrangement 140 via an external high pressure line 136A, 136B and an external low pressure line 138A, 138B. In some implementations, the low pressure line 138A, 138B is fluidly coupled to the internal low pressure line 123 at the second return interface 116 of the respective power pack 110A, 110B. In other implementations, the external low pressure lines 138A, 138B and the internal low pressure line 123 are formed by a common fluid conduit that extends through the second return interface 116. In some implementations, the external high pressure lines 136A, 136B fluidly couple to the high pressure lines 132A, 132B, respectively, outside the respective power pack body 111. In other implementations, the external high pressure line 136A, 136B may pass through the respective body 111 at a separate port (not shown) to fluidly couple to the internal high pressure line 121 within the power pack body 111.

The motor 122 (and/or pump 120) of each power pack 110A, 110B is operated by a respective motor controller 106, 108. In certain examples, each motor controller 106, 108 is operated independent of the other. In certain examples, each motor controller 106, 108 is configured to receive data from the sensors 128, 119 of the respective power pack 110A, 110B. In certain examples, each motor controller 106, 108 is powered by a respective power source E1, E2.

Figure 3:
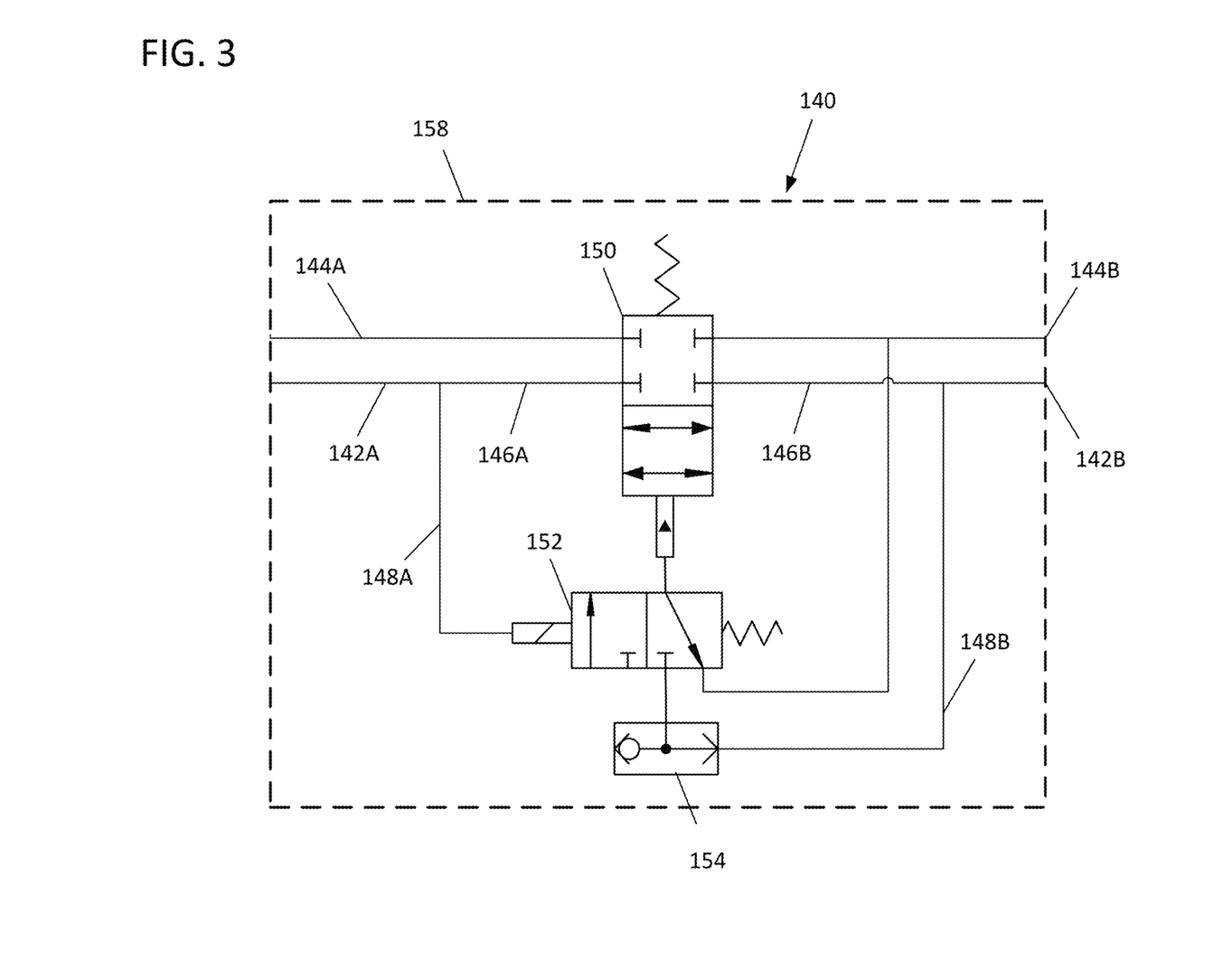
FIG. 3 shows a diagram of an example backup valve arrangement suitable for use in the distributed hydraulic system of FIG. 1.

FIG. 3 shows an example implementation of a backup valve arrangement 140 suitable for use in selectively coupling one of the power packs 110A, 110B to both main landing gear actuators 102, 104 in the event of a failure of the other one of the power packs 110A, 110B. The backup valve arrangement 140 includes a valve spool 150 having an open position and a closed position. The valve spool 150 selectively couples together the external high pressure lines 136A, 136B from the first and second power packs 110A, 110B when in the open position. The valve spool 150 also selectively couples together the external low pressure lines 138A, 138B from the first and second power packs 110A, 110B when in the open position. When in the closed position, the valve spool 150 decouples the high pressure lines 136A, 13B and decouples the low pressure lines 138A, 138B. In certain examples, the valve spool 150 is biased to the closed position.

In certain implementations, movement of the valve spool 150 between the open and closed positions is managed by a piloting solenoid valve 152. In certain examples, the piloting solenoid valve 152 is controlled by the aircraft operating system as will be described in more detail herein. In certain implementations, the piloting solenoid valve 152 selectively couples the valve spool 150 to the high pressure line of the functioning power pack 110A, 110B to transition the valve spool 150 from the closed position to the open position as will be described herein. In certain examples, the piloting solenoid valve 152 selectively couples the valve spool 150 to the functioning high pressure line via a shuttle valve 154.

In certain examples, the backup valve arrangement 140 has a first high pressure line 142A and a first return line 144A that fluidly couple to the external high pressure line 136A and the external low pressure line 138A, respectively, from the first power pack 110A. The backup valve arrangement 140 also has a second high pressure line 142B and a second return line 144B that fluidly couple to the external high pressure line 136B and the external low pressure line 138B, respectively, from the second power pack 110B. A portion of the fluid from each high pressure line 142A, 142B of the backup valve arrangement 140 is directed to the valve spool 150 via a respective sub-line 146A, 146B. Another portion of the fluid from each high pressure line 142A, 142B of the backup valve arrangement 140 is directed to the shuttle valve 154 via another respective sub-line 148A, 148B.

As noted above, the shuttle valve 154 is fluidly coupled to the high pressure lines 136A, 136B of both power packs 110A, 110B. The shuttle valve 154 outputs fluid from whichever of the lines 136A, 136B has the higher pressure. Accordingly, if one of the power packs fails, the shuttle valve 154 would output fluid from the high pressure line 136A, 136B of the functioning power pack 110A, 110B. The shuttle valve 154 outputs the fluid to the piloting solenoid.

The piloting solenoid transitions between a non-actuated position and an actuated position. When in the non-actuated position, the piloting solenoid 152 blocks fluid output from the shuttle valve 154 from reaching the valve spool 150. When in the actuated position, the piloting solenoid 152 allows fluid output from the shuttle valve 154 to push the valve spool 150 from the closed position to the open position. In certain examples, the piloting solenoid 152 is biased to the non-actuated position.

Figure 4:
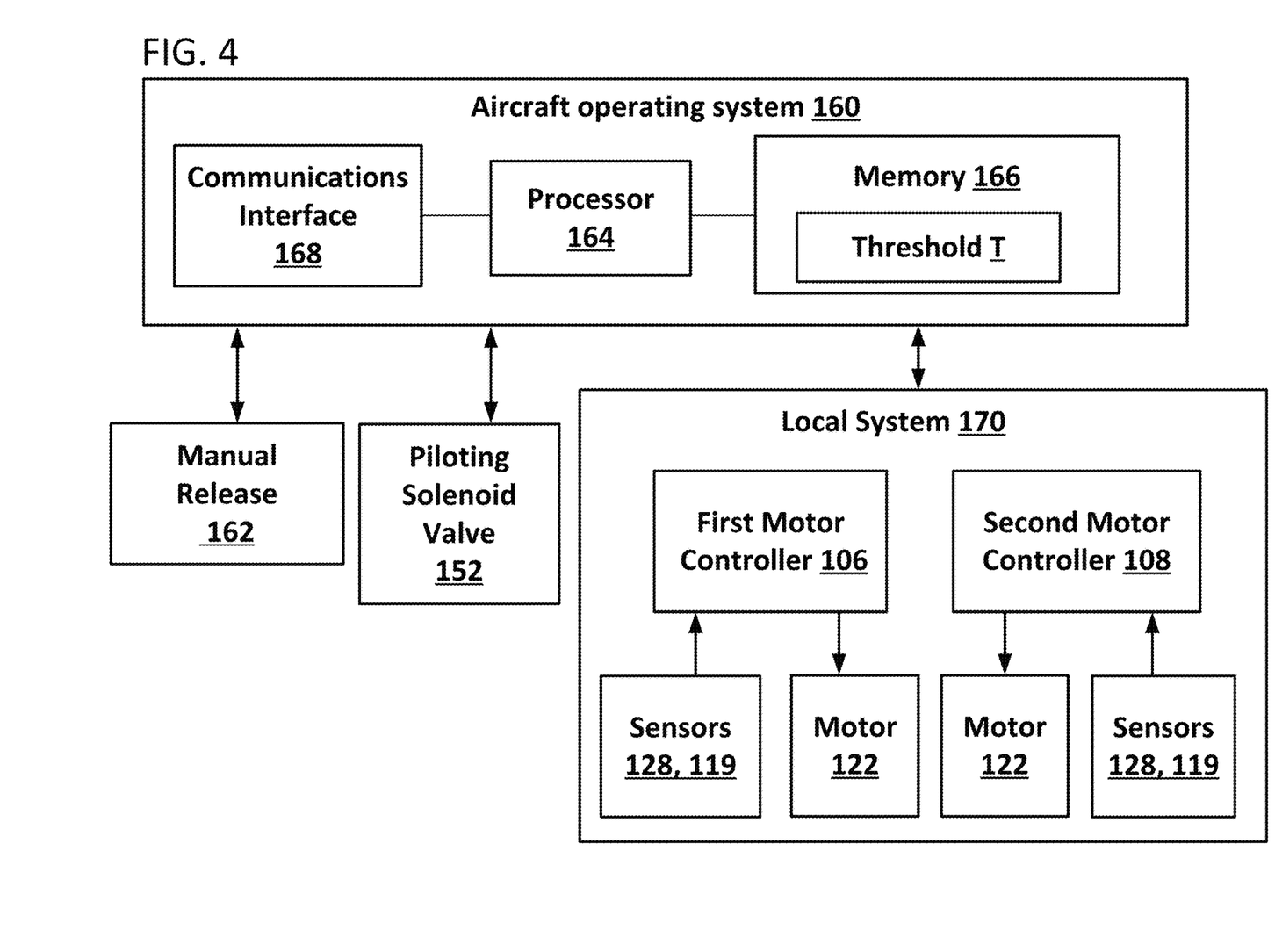
FIG. 4 shows a diagram of the electronic systems managing the distributed hydraulic system of FIG. 1.

FIG. 4 is a schematic diagram showing how the aircraft operating system 160 manages deployment and retraction of the main landing gears. The aircraft operating system 160 includes a processor 164 (e.g., a central processor, a distributed processor, etc.) electrically coupled to memory 166 and to one or more communications interfaces 168. Instructions for operating the aircraft systems (e.g., for managing the first and second motor controllers 106, 108) are stored in memory 166. In certain examples, a threshold pressure value or range T expected in high pressure lines within the power packs 110A, 110B also is stored in memory 166. The communications interfaces 168 electronically each electronically couple to one or more aircraft control systems.

In some examples, a communications interface 168 of the aircraft operating system 160 is electronically coupled to a local hydraulic control system 170. The local system 170 manages the first and second motor controllers 106, 108. In other examples, separate communications interfaces 168 separately couple to the first and second motor controllers 106, 108. As noted above, the first motor controller 106 operates the pump 120 (e.g., via the motor 122) of the first power pack 110A and the second motor controller 108 operates the pump 120 (e.g., via the motor 122) of the second power pack 110B.

The aircraft operating system 160 also is electronically coupled (e.g., via the same or another communications interface 168) to the piloting solenoid valve 152. In some implementations, the operation system 160 is electronically coupled to the piloting solenoid valve 152 separate from the local hydraulic control system 170. In other implementations, the operation system 160 is electronically coupled to the piloting solenoid valve 152 through the local hydraulic control system 170. In still other implementations, operation of the piloting solenoid valve 152 may be controlled directly by the local hydraulic control system 170. In certain examples, the aircraft operation system 160 also is separately electronically coupled to a manual release 162 for the main landing gear system.

Each of the first and second motor controllers 106, 108 are electronically coupled to the motors 122 of the respective power packs 110A, 110B. Each of the first and second motor controllers 106, 108 are electronically coupled to the various sensors 128, 119 within the respective power pack 110A, 110B. Accordingly, the first and second motor controllers 106, 108 receive data (e.g., sensor data OSC) from the sensors 128, 119. Each motor controller 106, 108 also passes data to the aircraft operation system 160. In some examples, the motor controllers 106, 108 pass on the sensor data to the aircraft operation system 160. In other examples, the motor controllers 106, 108 process the sensor data to determine whether a fault has occurred in one of the power packs. If a fault occurs, then the motor controller 106, 108 passes a fault alert to the aircraft operation system 160. In some implementations, the motor controller 106, 108 reporting the fault ceases operation. In other implementations, the motor controller 106, 108 reporting the fault continues trying to operate.

In some implementations, the motor controller 106, 108 not reporting the fault continues normal operation (i.e., does not increase pump speed or otherwise vary the operation of the pump of the still functional power pack). In other implementations, the motor controller 106, 108 not reporting the fault may increase the pump speed to fill the demand. For example, the corresponding pump 120 may be a variable speed pump configured to maintain a relatively constant hydraulic flow within a maximum speed limit.

Upon receiving the fault alert (or upon determining a fault condition based on the sensor readings), the aircraft operating system 160 is configured to trigger the piloting solenoid valve 152 to transition from the non-actuated position to the actuated position. Accordingly, the aircraft operating system 160 retains control over when to assign management of both main landing gears to a single power pack 110. In other implementations, the piloting solenoid valve 152 can be controlled by an independent electronic controller that monitors the sensor readings.

In use, when the aircraft operating system 160 determines that the main landing gear should be deployed or retracted, the aircraft operating system 160 sends commands CS to the first motor controller 106 and the second motor controller 108 to run the motors 122 of both power packs 110A, 110B. Each of the first and second motor controllers 106, 108 runs the motor 122 of the respective power pack 110A, 110B to actuate the respective pump 120. Further, each of the motor controller 106, 108 obtains sensor readings OSC (e.g., pressure readings from the pressure transducer 128) from the respective power pack 110A, 110B.

The obtained sensor readings are analyzed (e.g., by the first and second motor controllers 106, 108) to determine whether or not the sensed pressure is below a predetermined threshold T. The threshold T is set based on the expected value of the pressure within the high pressure lines 121A, 121B when the power packs 110A, 110B are operating normally. If the pressure readings are below the threshold T, then the motor controller 106, 108 sensing the lack of pressure sends a fault alert back to the aircraft operating system 160. Upon receiving the fault alert, the aircraft operating system 160 activates the backup valve arrangement 140 to connect both main landing gear actuators 102, 104 to the power pack 110A, 110B that did not produce a fault. For example, the aircraft operating system 160 may send a command to the pilot solenoid 152 to transition to the actuated position.

Figure 5:
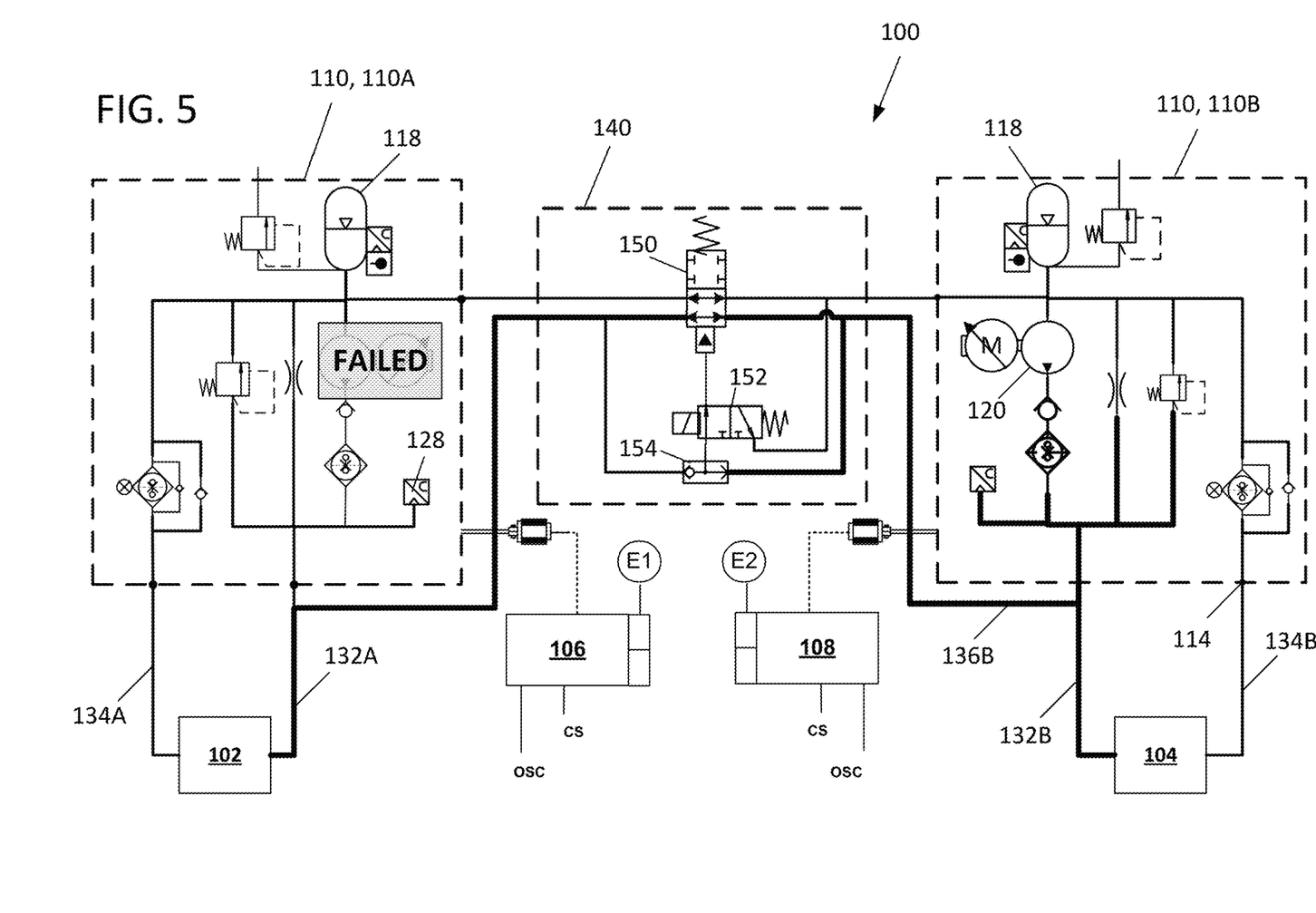
FIG. 5 shows the results of a fault in the first power pack of FIG. 1.

FIG. 5 illustrates the result of a failure in the first hydraulic power pack 110A of FIG. 1. In the example shown, the failure occurs at the pump 120 or motor 122 of the first power pack 110A. In other examples, the failure could occur at the high pressure filter module 124 or elsewhere along the high pressure line. Because the pressure in the high pressure line 132 of the first power pack 110A is lacking, the fluid in high pressure line 148B overwhelms the fluid in the high pressure line 148A so that the shuttle valve 154 outputs the fluid from the high pressure line 148B, which is fluidly coupled to the high pressure line 136B of the second power pack 110B. Accordingly, the fluid from the high pressure line 136B passes through the shuttle valve 154 to the piloting solenoid 152.

The piloting solenoid 152 has been transitioned to the actuated position (e.g., electronically by the aircraft operating system 160) to allow the fluid from the shuttle valve 154 to press against the valve spool 150 to open the valve spool. Once the valve spool 150 is transitioned to the open position (e.g., using the fluid pressure from the high pressure line 148B), the valve spool 150 couples the high pressure lines 146A, 146B to thereby couple the high pressure lines 136A, 136B from the first and second power packs 110A, 110B. The valve spool 150 also couples the low pressure lines 144A, 144B, which fluidly couple the low pressure lines 138A, 138B from the first and second power packs 110A, 110B.

The pump 120 of the second power pack 110B pulls fluid from the combined low pressure line. Accordingly, the pump 120 of the second power pack 110B pulls fluid both from the reservoir 118 of the second power pack 110B and from the reservoir 118 of the first power pack 110A via the second return interface 116. The pump 120 drives the fluid through the high pressure filter module 124 and to the load interface 112 of the second power pack 110B. A portion of the fluid output through the load interface 112 of the second power pack 110B is routed to the right main landing gear 104. Another portion of the fluid output through the load interface 112 is routed through the valve spool 150 to the left main landing gear actuator 102. In particular, after passing through the valve spool 150, the fluid travels along the high pressure line 136A to the high pressure line 132A leading to the left main landing gear actuator 102.

Fluid returns from the right main landing gear actuator 104 along the low pressure line 134B, through the first return interface 114, and into the second power pack 110B. The fluid may pass through the low pressure filter module 126 and towards the reservoir 118 and/or pump 120. Fluid returns from the left main landing gear actuator 102 along the low pressure line 134A, through the first return interface 114, and into the first power pack 110A. The fluid may pass through the low pressure filter module 126 and towards the second return interface 116 of the first power pack 110A. The fluid then exits the first power pack 110A through the respective second return interface 116, flows through the valve spool 150, and flows into the second power pack 110B through the respective second return interface 116 and towards the pump 120 or reservoir 118. To facilitate transfer of the low pressure fluid between power packs, no filter modules are disposed in either power pack 110A, 110B between the respective reservoir 118 and the respective second return interface 116.

Referring to FIG. 1, the backup valve arrangement 140 includes a first load bypass interface 142, a second load bypass interface 144, a first tank (i.e., reservoir) bypass interface 146, and a second tank (i.e., reservoir) bypass interface 148. The first load bypass interface 142 is fluidly coupled to the load interface 112 of the first hydraulic power pack 110A. The second load bypass interface 144 is fluidly coupled to the load interface 112 of the second hydraulic power pack 110B. The first tank bypass interface 146 is fluidly coupled to the second return interface 116 of the first hydraulic power pack 110A. The second tank bypass interface 148 is fluidly coupled to the second return interface 116 of the second hydraulic power pack 110B.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A hydraulic system to operate a main landing gear system on an aircraft, the main landing gear system including a left main landing gear actuator and a right main landing gear actuator, the hydraulic system comprising:
    a first hydraulic power pack configured to actuate the left main landing gear actuator, the first hydraulic power pack defining a load interface, a first return interface, and a second return interface, the first hydraulic power pack including a reservoir, which is fluidly coupled to the first and second return interfaces of the first hydraulic power pack, and a pump configured to draw fluid from the reservoir of the first hydraulic power pack, to pressurize the drawn fluid, and to direct the pressurized fluid to the load interface of the first hydraulic power pack;
    a second hydraulic power pack configured to actuate the right main landing gear actuator, the second hydraulic power pack defining a load interface, a first return interface, and a second return interface, the second hydraulic power pack including a reservoir, which is fluidly coupled to the first and second return interfaces of the second hydraulic power pack, and a pump configured to draw fluid from the reservoir of the second hydraulic power pack, to pressurize the drawn fluid, and to direct the pressurized fluid to the load interface of the second hydraulic power pack; and
    a backup valve arrangement including a first load bypass interface, a second load bypass interface, a first tank bypass interface, and a second tank bypass interface, wherein the first load bypass interface is fluidly coupled to the load interface of the first hydraulic power pack, the second load bypass interface is fluidly coupled to the load interface of the second hydraulic power pack, the first tank bypass interface is fluidly coupled to the second return interface of the first hydraulic power pack, and the second tank bypass interface is fluidly coupled to the second return interface of the second hydraulic power pack.

2. The hydraulic system of claim 1, wherein the first and second load bypass interfaces are fluidly coupled to the respective load interfaces at locations external to the first and second hydraulic power packs.

3. The hydraulic system of claim 1, wherein each of the first and second hydraulic power packs includes a respective low pressure filter element fluidly disposed between the respective first return interface and the respective reservoir; and wherein each of the first and second hydraulic power packs is devoid of filter elements between the respective second return interface and the respective reservoir.

4. The hydraulic system of claim 1, wherein each hydraulic power pack includes a high pressure filter element disposed downstream of the respective pump and upstream of the respective load interface.

5. The hydraulic system of claim 1, wherein the backup valve arrangement includes a valve spool movable between an open position and a closed position, the valve spool fluidly coupling the first load bypass interface and the second load bypass interface together when in the open position and decoupling the first and second load bypass interfaces when in the closed position, wherein the valve spool is biased to the closed position.

6. The hydraulic system of claim 5, wherein the valve spool also fluidly couples the first and second tank bypass interfaces together when in the open position and decouples the first and second tank bypass interfaces when in the closed position.

7. The hydraulic system of claim 5, wherein the backup valve arrangement also includes a shuttle valve to supply pressure to the valve spool to move the valve spool from the closed position to the open position, the shuttle valve having an output directed towards the valve spool, a first input fluidly coupled to the first load bypass interface, and a second input fluidly coupled to the second load bypass interface.

8. The hydraulic system of claim 7, wherein the backup valve arrangement also includes a piloting solenoid disposed between the output of the shuttle valve and the valve spool, the piloting solenoid configured to selectively couple and decouple the output of the shuttle valve and the valve spool.

9. The hydraulic system of claim 8, wherein the piloting solenoid valve is electronically controlled by a system processor for the aircraft.

10. The hydraulic system of claim 9, wherein the pumps are fixed displacement pumps driven by first and second variable speed motors, respectively.

11. The hydraulic fluid system of claim 10, further comprising a first electronic controller configured to operate the first variable speed motor and a second electronic controller configured to operate the second variable speed motor, wherein neither the first electronic controller nor the second electronic controller is configured to operate the piloting solenoid valve.

12. The hydraulic fluid system of claim 1, wherein the pump and reservoir of each hydraulic power pack are sized to supply sufficient power to operate the main landing gear actuator of one of the left and right main landing gears within a first time period and to supply sufficient power to operate the main landing gear actuators of both of the left and right main landing gears within a second time period that is longer than the first time period.

13. A hydraulic system to operate a main landing gear system on an aircraft, the main landing gear system including a first main landing gear actuator and a second main landing gear actuator, each of the first and second main landing gear actuators operating a respective one of the left and right main landing gears, the hydraulic system comprising:
    a first high pressure fluid path extending between a first pump and the first main landing gear actuator;
    a first pressure sensor disposed along the first high pressure fluid path;
    a first low pressure fluid path extending between the first main landing gear actuator and a first return interface;
    a second high pressure fluid path extending between a second pump and the second main landing gear actuator;
    a second pressure sensor disposed along the second high pressure fluid path;
    a second low pressure fluid path extending between the second main landing gear actuator and a second return interface;
    a backup load path extending between the first high pressure fluid path and the second high pressure fluid path, wherein the backup load path is selectively disrupted and connected by a backup valve when the backup valve moves between the closed and open positions, respectively;

a backup return path extending between the first and second low pressure fluid paths, wherein the backup return path is selectively disrupted and connected by the backup valve when the backup valve moves between closed and open positions, respectively;

a piloting solenoid valve operationally coupled to the backup valve to move the backup valve between the closed and open positions; and an electronic control system configured to receive pressure data from the first and second pressure sensors and to actuate the piloting solenoid valve to move the backup valve between the closed and open positions.

14. The hydraulic system of claim 13, wherein the backup valve is biased to the closed position.

15. The hydraulic system of claim 13, wherein the first and second low pressure fluid paths each include a low pressure filter element, and wherein the backup return path is devoid of any filter elements.

16. The hydraulic system of claim 13, wherein the first and second high pressure fluid paths each include a high pressure filter element, and wherein the backup load path is devoid of any filter elements.

17. The hydraulic system of claim 13, wherein the first and second pumps are electronically controlled by a local hydraulic controller arrangement electrically coupled to the electronic control system, and wherein a decision to actuate the piloting solenoid valve based on the received pressure data is made by a higher level system than the local hydraulic controller arrangement.

18. The hydraulic system of claim 13, further comprising a shuttle valve supplying fluid to the piloting solenoid valve, the shuttle valve receiving the fluid from the backup load path.

19. A method of deploying a main landing gear system on an aircraft, the main landing gear system including a left main landing gear and a right main landing gear, the method comprising:

actuating a first hydraulic power pack to supply high pressure fluid along a first load path to an actuator of the left main landing gear and to receive low pressure fluid from the actuator of the left main landing gear along a first return path;

actuating a second hydraulic power pack to supply high pressure fluid along a second load path to an actuator of the right main landing gear and to receive low pressure fluid from the actuator of the right main landing gear along a second return path;

monitoring pressure readings along the first and second load paths;

determining a failure in a failed one of the first and second hydraulic power packs based on the pressure readings;

sending a failure alert to a system controller;

ceasing operation of the failed one of the first and second hydraulic power packs; and continuing normal operation of the other of the first and second hydraulic power packs.

20. The method of claim 19, wherein:

receiving a request to lower the first and second main landing gears;

actuating the first hydraulic power pack comprises sending a first deploy signal to a first controller of a first pump arrangement to send high pressure fluid along the first load path to the first main landing gear, wherein the first return path allows low pressure fluid to return from the first main landing gear to a first tank;

actuating the second hydraulic power pack comprises sending a second deploy signal to a second controller of a second pump arrangement to send high pressure fluid along the second load path to the second main landing gear, wherein the second return path allows low pressure fluid to return from the second main landing gear to a second tank;

monitoring the pressure readings comprises receiving sensor readings including a sensed pressure from the first load path, wherein the sensed pressure is less than a threshold; and ceasing operation of the failed one of the first and second hydraulic power packs comprises sending a system command to transition a backup valve arrangement from a closed position to an open position to fluidly couple the first and second load paths and to fluidly couple the first and second return paths, wherein the backup valve blocks fluid access between the first and second load paths and between the first and second return paths when in the closed position.

* * * * *